United States Patent [19]
Augeri

[11] 3,956,819
[45] May 18, 1976

[54] METHOD OF ASSEMBLING A TANTELUM CAPACITOR

[76] Inventor: Stephen L. Augeri, 139 Oakside Drive, Smithtown, N.Y. 11787

[22] Filed: Dec. 2, 1974

[21] Appl. No.: 528,695

[52] U.S. Cl. .................................. 29/570; 29/447; 317/230
[51] Int. Cl.² ............................................. H01G 9/24
[58] Field of Search .............. 29/570, 447; 317/230, 317/231, 232, 233

[56] References Cited
UNITED STATES PATENTS

| | | | |
|---|---|---|---|
| 3,293,507 | 12/1966 | Smith | 29/570 |
| 3,335,335 | 8/1967 | Perkins | 29/570 |
| 3,502,948 | 3/1970 | Crouch et al. | 317/230 |
| 3,564,347 | 2/1971 | Peck et al. | 29/570 |
| 3,684,927 | 8/1972 | Correll | 29/570 |

*Primary Examiner*—Carl E. Hall
*Attorney, Agent, or Firm*—Brumbaugh, Graves, Donohue & Raymond

[57] ABSTRACT

A method of making a tantalum capacitor molds a plug in situ on one end of an anode and about a connector which projects through the molded plug for electrical connection with the anode. A spacer is molded in situ on the other end of the anode. During molding, the plug and spacer form a permanent bond with the anode to form a core unit comprising the plug, connector, anode, and spacer. Ribs extending along sides of the anode connect the plug to the spacer to improve the physical integrity of the core unit. The core unit is then inserted in a can which is filled with a fluid electrolyte and crimped about the plug to seal the can. The preferred practice of the method additionally bonds the plug to the can and connector to hermetically seal the capacitor. A capacitor made according to the preferred method then comprises the core unit hermetically sealed in the electrolyte filled can.

1 Claim, 3 Drawing Figures

U.S. Patent   May 18, 1976   3,956,819
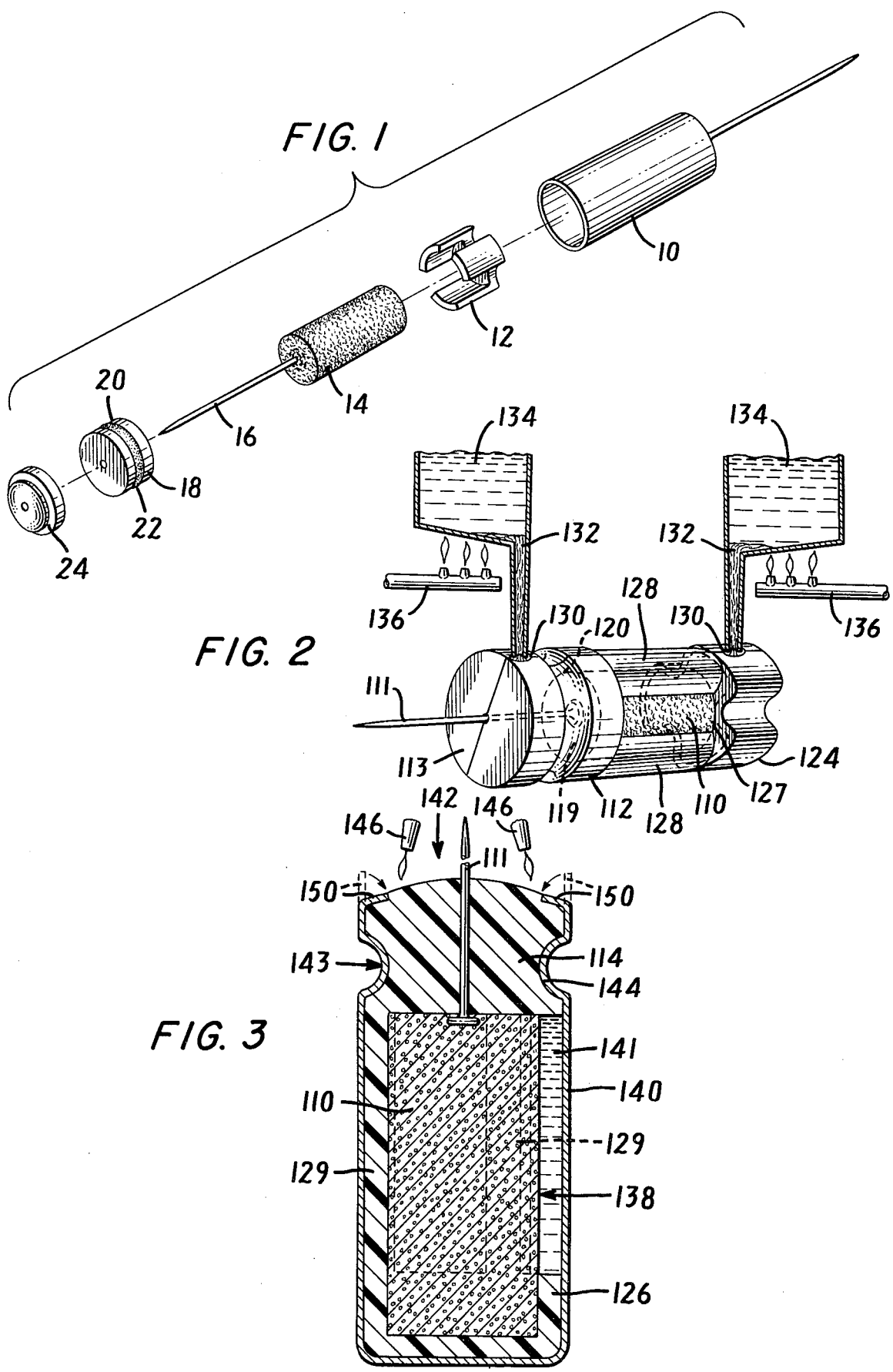

METHOD OF ASSEMBLING A TANTELUM CAPACITOR

BACKGROUND OF THE INVENTION

Tantalum capacitors have a core or anode of finely divided, sintered tantalum in an electrically conducting can filled with fluid electrolyte. The electrolyte contacts the electrically conducting can which then forms the cathode of the capacitor.

The finely divided, sintered tantalum anode is a porous, electrically conducting body having a thin, electrically insulating oxide layer on all surfaces throughout the porous body. When the anode is inserted in the electrolyte filled can, the electrolyte flows into the porous anode to form an electrical conductor spaced from the electrically conducting anode body by the thin, insulating, surface oxide. The spaced, electrically insulated conductors are a capacitor. Because the oxide layer is thin to narrowly space the electrolyte and the conducting anode body, and because the anode is finely divided to provide a large, coextensive surface area between the electrolyte and the conducting anode body, this capacitor structure has a very high ratio of capacitance to physical volume which is desirable in applications requiring a large capacitance in a small space.

Since the electrolyte functions as a conductor of the capacitor, it must be retained in the can for continued operation of the capacitor. The electrolyte is usually sulfuric acid to which the can and tantalum oxide insulation on the anode are impervious but which, in both its liquid vapor states, is highly corrosive of many other materials with which the capacitor may be used. It is therefore necessary to seal the capacitor against the escape of the liquid or vapor states of the electrolyte to maintain operation of the capacitor and prevent corrosion of adjacent materials.

It is known to seal the electrolyte in the can by crimping the can about a polytetrafluoroethylene plug placed in an open end of the can. The plug is usually grooved about its circumference to receive the crimped portion of the can for improving the seal. However, even with the addition of gasket material in the groove of the plug, the seal between the can and the plug often fails to be completely impervious to the liquid or vapor states of the electrolyte over an extended period of time.

Another sealing problem is presented by a connector which electrically connects the anode to other devices. The connector is often force-fit through the plug. However, the plug merely presses against the anode and the electrolyte may then flow between the anode and the plug to reach the portion of the plug penetrated by the connector. The electrolyte may then also escape through the force-fit hole where the connector penetrates the plug.

Although the oxide insulation on the anode is sufficient to electrically insulate the electrically conducting body of the anode from the electrolyte over their substantial, coextensive surface, contact of the cathode can and anode causes sufficient charge accumulation at the relatively small contact area to break the insulation of the oxide and short circuit the cathode to the anode. Such shorting destroys the capacitor. Therefore, the anode must be held out of contact with the can. The plug and a spacer fit between the anode and can at an end of the anode opposite the plug cooperate to hold the anode away from the can.

FIG. 1 is an exploded illustration of the several components assembled into one known tantalum capacitor. The capacitor comprises an open-ended can 10 for receiving the other components. A spacer 12 having a bottom and fingers for gripping an anode 14 is fit over one end of the anode. The anode and spacer are inserted in the can and the can filled with a fluid electrolyte (not shown). A connector 16 is electrically connected to the conducting anode body by inserting an end of the connector into an end of the finely divided anode material before it is sintered. The connector extends from the end of the anode opposite the spacer for making electrical connections to the anode. A plug 18 is force-fit over the connector and against the end of the anode. The plug has a groove 20 about a side which engages the can when the plug is positioned over the anode in the can. The can is then crimped into the groove to seal the can. A ring gasket 22 is sometimes fit in the groove 20 to improve the seal. The plug and connector cooperate to hold the anode away from the can. A cap 24 is force-fit on the connector over the plug and edges of the open end of the can folded over the cap to additionally seal the can and provide a finished outside surface to the capacitor.

Each of the described components is manufactured to very close tolerances, usually plus or minus a few thousandths of an inch. However, an accumulation of the maximum tolerance variation of each of the assembled components may still sufficiently displace certain components so as to cause failure of the capacitor. For example, an accumulation of the miximum tolerance in the bottom of the spacer, the anode, and the plug may sufficiently displace the crimp in the can from the groove in the plug to cause an improper seal or lift the plug from the anode to permit the anode to tilt into shorting contact with the can.

Each of the illustrated components of the capacitor is relatively small. For example, the lengths of cans of capacitors suitable for work for the federal government are in a range from one-fourth to three-fourths inch. Assembly of the correspondingly small individual components of the capacitor is then difficult, usually requiring extensive, relatively skilled manual labor for the exacting assembly of the small components. While such manual labor is ordinarily expensive, the highly corrosive sulfuric acid electrolyte with which the capacitors are ordinarily filled makes the work unpleasant and, therefore, additionally costly.

SUMMARY OF THE INVENTION

The invention provides a method of making tantalum capacitors which improves the sealing of the capacitor, reduces the sensitivity of the assembled capacitor to variation in the size of individual components, and substantially reduces the labor necessary for the assembly of the capacitor. A capacitor made in accordance with the method of the invention has a novel core unit which is inserted within a can to form the capacitor.

The method of making tantalum capacitors molds a plug and spacer in situ on opposite ends of an anode which is a known, porous body of finely divided, sintered tantalum with a connector projecting through the plug from one end of the anode. In one practice of the method, the plug and spacer form a permanent bond with the anode during molding to form a core unit. In another practice of the method one or more ribs connect the plug to the spacer along sides of the anode to form the core unit. The core unit of plug, anode, connector, and spacer is then inserted in a can which is filled with a fluid electrolyte and crimped about the plug to seal the can. In a preferred practice of this method the plug is additionally bonded to the can above the crimp to hermetically seal the can.

A capacitor made according to the method then comprises a core unit having a plug, anode, connector, spacer, and, in one embodiment, ribs connecting the plug to the spacer. The core unit is in a can which is filled with an electrolyte and crimped about the plug.

DESCRIPTION OF THE DRAWINGS

A known tantalum capacitor, the preferred practice of the method, and a preferred embodiment of a capacitor made according to the method are illustrated in drawings in which:

FIG. 1 is an exploded, perspective view of a known tantalum capacitor;

FIG. 2 is a schematic illustration of a preferred practice of part of the method; and FIG. 3 is a sectional elevation of a preferred embodiment of a capacitor made by the method.

DESCRIPTION OF THE PREFERRED METHOD AND A PREFERRED EMBODIMENT

FIG. 2 shows a known tantalum capacitor anode 110 which is porous body of finely divided, sintered tantalum having a connector 111 projecting from one end. A two-part mold 112 has a portion 113 with an internal molding chamber configured in the shape of a desired plug 114 (FIG. 3) positioned on one end 119 of the anode with the anode extending into an opening 120 in the plug mold portion and the connector 111 extending through the plug mold portion to project from the mold opposite the opening 120. Another portion 124 of the mold 112 has an internal molding chamber configured in the shape of a desired spacer 126 (FIG. 3) positioned on the other end of the anode with the anode extending into an opening 127 in the mold. Third portions 128 of the mold 112 extend along sides of the anode 110 from the plug portion 113 to the spacer portion 124 and have internal molding chambers communicating with the molding chambers of the mold portions 113, 124 for forming ribs 129 (FIG. 3) connecting the plug 114 to the spacer 126.

Sprew holes 130 in mold portions 113, 124 receive material 132 to be molded in the molds. The material 132 is melt processable to be melted in melt chambers 134 by heaters 136 for pouring from the melt chambers through the sprew holes into the mold. The mold is preferably also heated by means (not shown) to prevent the material from freezing up before it flows throughout the molding chambers in the mold.

One suitable molding material 132 is a fluorocarbon resin copolymer which combines a carbon-fluorine backbone with perfluoroalkoxy side chains; this material is called Teflon PFA and is commercially available from E. I. duPont de Nemours & Company (Inc.). However, the Teflon PFA material has a melt temperature of approximately 575° to 590°F. which exceeds the maximum operating temperature of some of the tantalum anodes with which it is desired to use the method. For these anodes, and others as desired, an alternative and also preferred material 132 is a copolymer of ethylene and chloro-trifluoro-ethylene; this material is called Halar and is commercially available from Allied Chemical Corp. Halar has a much lower melt temperature of about 375°F.

The molding material 132 is then cooled to harden in molding chambers in the form of the molding chambers to form the plug 114, spacer 126, and ribs 129 of the capacitor shown in FIG. 3. As the molding material is molded in the molding chambers, it forms a permanent bond with the ends of the anode in the molding chambers. The molding material in the plug mold portion 113 also forms a permanent bond with the portion of the connector 111 in the mold. The bond between the anode 110, connector 111, plug 114 and spacer 126 and the ribs 129 connecting the plug 114 to the spacer 126 assemble these components into a single core unit at 138 (FIG. 3). The core unit is then unmolded.

FIG. 3 shows the core unit 138 inserted, spacer end first, in a can 140 having an open end at 142 for receiving the core unit. The can is filled with fluid electrolyte 141 and crimped at 143 about a groove 144 which was molded into the plug 114 in the plug mold portion.

Although crimping the can into the groove 144 in the plug seals the can about the plug as known in the art, improved sealing of the can to the plug is provided in the preferred practice of the method by heating the plug 114 at the open end 142 of the can with heaters 146. The plug has much lower heat conductivity than the can which is generally metallic. Applying heat to the plug then permits the plug to be softened at the can without conducting excessive heat to the electrolyte 141 in the can. Excessive heating of the electrolyte may boil the electrolyte to distort the plug or can with the resulting pressure.

Heating the plug softens its surface at the opening 142 to melt flash and other mold marks from the surface. This provides a smooth surface to the plug which gives the capacitor a finished appearance formerly provided by the separate cap 24 (FIG. 1) in capacitors of known construction. The edges 150 of the can are folded against and embeded in the softened surface of the plug to further improve the finished appearance of the capacitor and the sealing of the can with the plug. However, the most important function of heat softening the plug at the can is to form, upon cooling, a bond between the plug and the can which hermetically seals the can. During this heat sealing process, the preferred Teflon PFA and Halar plug material shrink about 4–5 percent by volume. This shrinking draws the plug against the crimp 143 in the can to still further improve the sealing of the can.

While heating the plug to form the improved, hermetic seal between the plug and the can, the plug must not be softened to the extent that it melts away from the can and runs into the space between the can and the anode which is filled with the electrolyte. For the preferred Teflon PFA or Halar materials from which the plug is molded, it has been found suitable to flash heat the plug for approximately 1 second to a surface temperature of 800°F.

While the preferred practice of the method described with reference to FIG. 2 uses a pour molding technique for molding the plug and spacer on the anode, alternative practice of the method may employ other molding techniques well-known in the art. For example, injection molding or rotary molding techniques may be used to mold the spacer and the plug to the anode for forming the core unit. The selection of particular molding materials may influence the selection of the molding technique best suited for forming the core unit with the selected molding material. Molding materials which are suitable for forming the core unit are those which may be molded into the spacer and plug and which preferably form a permanent bond between the plug, connector, spacer, and anode. Preferably, the molding material may also be bonded to the can after molding for forming the hermetic seal between the plug and the can. The selected molding material must also be impervious to the electrolyte with which the capacitor is filled and electrically insulating The preferred method overcomes each of the problems described for known tantalum capacitors. The bond between plug, connector, and can hermetically seals the capacitor to prevent the escape of the electrolyte in either its fluid or vapor states. In addition, the improved hermetic seal permits a smaller crimp to be used thereby permitting a larger anode of higher capacitance to be put in the same size can as holds only a smaller anode with the known, larger crimp. The bond between the plug and anode holds the anode away from the can to prevent short circuiting of the anode to the can. Finally, forming the plug, connector, anode, and spacer as a single, preassembled core unit greatly reduces the labor necessary for assembling the capacitor from the core unit and can over that required for assembling a capacitor from the several individual components of known capacitors.

FIG. 3 illustrates a preferred capacitor such as is assembled by the preferred practice of the method. The capacitor has a core unit at 138. The core unit comprises the anode 110, connector 111, plug 114, spacer 126, and ribs 129 which have been permanently bonded and molded together into the core unit. The connector 111 extends through the plug 114 and into the anode 110 for electrically connecting the anode to the connector. The plug has a finished outer surface at the opening 142 which supersedes the cap 24 (FIG. 1) of known capacitors and is bonded to the connector to seal the plug about the connector. Ribs 129 connect the plug 114 to the spacer 126 along sides of the anode to further improve the physical integrity of the core unit and hold the anode 110 away from the can 140 over the entire length of the anode. The core unit is inserted in a can 140 with the spacer engaging a bottom of a can and the connector 122 projecting from the open end 142 of the can.

A space between the anode and the can is filled with the electrolyte 141, for example sulfuric acid, which additionally flows through the porous body of the anode 110. The can is crimped at 143 against the plug to seal the can to the plug. The plug is also heat bonded to the can above the crimp to hermetically seal the electrolyte in the can and draw the plug against the crimp to further seal the can. Edges 150 of the can at the open end 142 are folded over peripherial portions of the plug to still further seal the can and to provide a finished end to the capacitor.

I claim:

1. A method of assembling a tantalum capacitor having an anode of finely divided, sintered tantalum, the method comprising the steps of:

bonding a plug to one end of the anode; bonding a connector to the plug, the connector extending through the plug into one end of the anode for electrically connecting the connector to the anode; bonding a spacer to the other end of the anode for forming a core unit of the bonded plug, connector, anode, and spacer; inserting the core unit, spacer end first, in a can; filling the can with a fluid electrolyte; crimping the can to the plug for sealing the can; and bonding the plug to the can to hermetically seal the can by heating the plug in the can to heat soften the plug for bonding to the can, the plug shrinking during the heat bonding step to draw the plug against the crimp for further sealing the can.

* * * * *